United States Patent
Lee et al.

(10) Patent No.: US 8,116,628 B2
(45) Date of Patent: *Feb. 14, 2012

(54) WAVELENGTH-DIVISION MULTIPLEXED PASSIVE OPTICAL NETWORK FOR EMBODYING WAVELENGTH-INDEPENDENT OPERATION OF WAVELENGTH-LOCKED FABRY-PEROT LASER DIODES BY INJECTING A LOW NOISE BROADBAND LIGHT SOURCE

(75) Inventors: Chang-Hee Lee, Daejeon (KR); Ki-Man Choi, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 707 days.

This patent is subject to a terminal disclaimer.

(21) Appl. No.: 12/087,723

(22) PCT Filed: Jul. 11, 2006

(86) PCT No.: PCT/KR2006/002728
§ 371 (c)(1),
(2), (4) Date: Dec. 8, 2008

(87) PCT Pub. No.: WO2007/081076
PCT Pub. Date: Jul. 19, 2007

(65) Prior Publication Data
US 2009/0092390 A1    Apr. 9, 2009

(30) Foreign Application Priority Data
Jan. 9, 2006  (KR) ........................ 10-2006-0002470

(51) Int. Cl.
H04J 14/02  (2006.01)
(52) U.S. Cl. ................ 398/72; 398/91; 398/92
(58) Field of Classification Search ............. 398/70–72, 398/91–92
See application file for complete search history.

(56) References Cited

U.S. PATENT DOCUMENTS
7,073,956 B1 *  7/2006  Shin et al. .................. 385/89
(Continued)

FOREIGN PATENT DOCUMENTS
KR   10-2005-009684 A    9/2005
(Continued)

OTHER PUBLICATIONS

Kim, Hyun-Deok, et al., "A Low-Cost WDM source with an ASE Injected Fabry—Perot semiconductor laser," IEEE Photon. Technol. Lett., vol. 12, No. 8, pp. 1067-1069, Aug. 2000.
(Continued)

*Primary Examiner* — Leslie Pascal
(74) *Attorney, Agent, or Firm* — Blakely, Sokoloff, Taylor & Zafman LLP.

(57) ABSTRACT

The present invention relates to a wavelength-division multiplexed passive optical network (WDM-PON) which embodies wavelength-independence of wavelength-locked Fabry Perot-Laser Diode (F-P LD). A WDM-PON of the present invention comprises an optical fiber being used for optical transmission to and from a broadband light source (BLS) with a low noise characteristic; first arrayed waveguide Gratings (AWG) for filtering light transmitted from the BLS which is oscillated in a plural mode into a group of n numbers wherein the first AWG have a bandwidth broader than a bandwidth of one mode of the BLS; n F-P LDs outputting wavelength-locked light by light being injected through the first AWG; a circulator bypassing and outputting wavelength-division multiplexed signals which are inputted through the first AWG and the optical fiber; and second AWG de-multiplexing the WDM signals into a group of n numbers wherein the second AWG have a bandwidth broader than the bandwidth of the BLS to be injected, wherein the number n is either the number of output ports of the first or second AWG or the number of channels of the WDM signals.

22 Claims, 4 Drawing Sheets

U.S. PATENT DOCUMENTS

| | | |
|---|---|---|
| 2001/0004290 A1 | 6/2001 | Lee et al. |
| 2005/0041971 A1* | 2/2005 | Lee et al. ............... 398/72 |
| 2005/0074240 A1* | 4/2005 | Jung et al. ............... 398/72 |
| 2010/0221008 A1 | 9/2010 | Lee et al. |

FOREIGN PATENT DOCUMENTS

| | | |
|---|---|---|
| KR | 10-2005-0092680 A | 9/2005 |
| WO | WO 2006/052075 A1 | 5/2006 |
| WO | WO 2007/027042 A1 | 3/2007 |

OTHER PUBLICATIONS

Choi, K.M., et al., "Broad-band Light Source Using Mutually Injected Fabry—Pérot Laser Diodes for WDM-PON," IEEE Photon. Technol. Lett., vol. 17, No. 12, pp. 2529-2531, Dec. 2005.

PCT International Search Report and Written Opinion for International Application No. PCT/KR2006/002728, mailed Nov. 8, 2006, 8 pages.

PCT International Preliminary Report on Patentability for International Application No. PCT/KR2006/002728, dated Jul. 15, 2008, 7 pages.

* cited by examiner

WAVELENGTH-DIVISION MULTIPLEXED PASSIVE OPTICAL NETWORK FOR EMBODYING WAVELENGTH-INDEPENDENT OPERATION OF WAVELENGTH-LOCKED FABRY-PEROT LASER DIODES BY INJECTING A LOW NOISE BROADBAND LIGHT SOURCE

CROSS REFERENCE TO RELATED APPLICATIONS

This application is a U.S. National Phase Application under 35 U.S.C. 371 of International Application No. PCT/KR2006/002728, filed Jul. 11, 2006, which claims priority from South Korean Patent Application entitled "A WAVELENGTH-DIVISION MULTIPLEXED PASSIVE OPTICAL NETWORK FOR EMBODYING WAVELENGTH-INDEPENDENT OPERATION OF WAVELENGTH-LOCKED FABRY-PEROT LASER DIODES BY INJECTING A LOW NOISE BROADBAND LIGHT SOURCE," Serial No. 10-2006-0002470, filed Jan. 9, 2006.

TECHNICAL FIELD

The present invention relates to a wavelength-division multiplexed passive optical network (WDM-PON) for embodying wavelength-independent operation of a wavelength-locked Fabry-Perot laser diode (F-P LD). More specifically, the present invention relates to a WDM-PON for embodying wavelength-independent operation of wavelength-locked F-P LD capable of high density transmission and high speed transmission by minimizing noise of wavelength-locked F-P LD and thereby obtaining wavelength independence, by injecting a low noise broadband light source (BLS) and using Arrayed Waveguide Gratings (AWG) each having a broader bandwidth than the bandwidth of the low noise BLS being injected.

BACKGROUND ART

A current access network provides an access to Internet services mainly through ADSL or VDSL which uses a telephone line, or a cable modem which uses a coaxial cable. Both the telephone line and the coaxial cable are provided with copper wires. A bandwidth to the subscribers may vary depending on transmission distances and thus a maximum value of the bandwidth is limited to approximately several 10 Mb/s. However, demand on a wider bandwidth in an access network is rapidly increased as voice and text oriented services have evolved to data and video based services. As one method to meet this high speed requirement, a study on PON technologies based on optical fiber has actively carried out and a WDM-PON among current PON technologies, which can provide a bandwidth of more than 100 Mb/s and guarantee a high quality of service (QoS) to the subscribers, is perceived to be an ultimate solution. Generally, in the architecture of WDM-PON, AWG is mainly used as a filter for a wavelength division multiplexed signal. However, a wavelength assigned to per each subscriber brings about inventory problem and its variation depending on ambient temperature requires an expensive control unit. Thus, a low-cost light source having wavelength-independent operation, i.e., color-free operation is essentially required to easily control and manage wavelength.

Regarding a low-cost light source, Hyun-Deok Kim, et al., proposed a Wavelength-Locked F-P LD as a light source for WDM-PON in their article entitled "A low-cost WDM source with an incoherent light injected Fabry-Perot semiconductor laser diode," *IEEE Photon. Technol. Lett.*, vol. 12, no. 8, pp. 1067-1069, August 2000. The Wavelength-Locked Fabry-Perot laser diode proposed by Hyun-Deok Kim, et al., uses a method for locking an oscillation wavelength of F-P LD into a wavelength of a BLS by injecting the BLS into the F-P LD which oscillates in a multi-mode. This has currently been recognized to be the most cost-effective light source for WDM-PON. Further, a study on a wavelength-seeded reflective semiconductor optical amplifier (RSOA) using RSOA instead of F-P LD has also carried out actively.

In a wavelength-locked F-P LD or a wavelength-seeded RSOA, light emitting diode (LED) with a high output power, Erbium-Doped Fiber Amplifier (EDFA) emitting Amplified Spontaneous Emission (ASE), Super Luminescent Diode (SLD), etc. are used as a BLS being injected. However, in the ASE-based BLS being injected generally for wavelength-locked F-P LD, the filtered bandwidth of the BLS is determined by the bandwidth of AWG to be used. Accordingly, the narrower bandwidth of AWG leads to worse relative intensity noise (RIN) of the BLS, which results in a certain limitation in increasing a number of subscribers and a bit rate. More specifically, a channel spacing of AWG must be decreased to increase a number of subscribers. In such a case, however, the bandwidth of each channel is also decreased, which leads to worse RIN of the filtered BLS.

In addition, in case that a center wavelength of the BLS being injected corresponds to an oscillation wavelength of F-P LD, an effect of suppression in mode partition noise of F-P LD can be obtained. However, in case that the center wavelength of BLS lies in between two oscillation modes of F-P LD, the mode partition noise suppression effect cannot be obtained. Rather, the noise of wavelength-locked F-P LD is more increased than the RIN of the injected BLS. The noise is increased further, when the output of the wavelength locked F-P LD passes through AWGs for multiplexing and de-multiplexing.

As described above, the increased noise functions as the most serious obstacle in embodying wavelength independence of wavelength-locked F-P LD for a WDM light source as the channel spacing of AWG is narrower and the transmission data rate is higher. Accordingly, due to the above obstacle, there is a problem which cannot fully guarantee the noise characteristic which equals to or is below RIN requirement for satisfying a bit error rate (BER) of $10^{-12}$ (Q=7, where Q is one parameter having a 1:1 relationship with BER) in order to embody wavelength independence.

DISCLOSURE OF INVENTION

Technical Problem

One object of the present invention is to solve the prior art problems and provide a high density and high speed WDM-PON for embodying wavelength-independent operation by using wavelength-locked F-P LD, as a light source, by using a multi-mode type BLS having a narrower bandwidth than the bandwidth of AWG and having a superior noise characteristic to a filtered ASE as an injection light.

Technical Solution

According to one aspect of the present invention, the present invention provides a WDM-PON comprising an optical fiber being used for optical transmission to and from a BLS with a low noise characteristic; first AWG for filtering light transmitted from the BLS which is oscillated in a plural mode into a group of n numbers wherein the first AWG have a bandwidth broader than a bandwidth of one mode of the BLS; n F-P LDs outputting wavelength-locked light by light being injected through the first AWG; a circulator bypassing and outputting WDM signals which are inputted through the first AWG and the optical fiber; and second AWG de-multiplexing the WDM signals into a group of n numbers wherein the second AWG have a bandwidth broader than the bandwidth of the BLS to be injected, wherein the number n is either the number of output ports of the first or second AWG or the number of channels of the WDM signals.

Further features and advantages of the present invention can be obviously understood with reference to the accompanying drawings where same or similar reference numerals indicate same components.

Advantageous Effects

According to a WDM-PON of the present invention, it is possible to embody a device for subscribers having wavelength-independence by minimizing noise of wavelength-locked F-P LD through injecting a low noise BLS employing a mutual injection principle of F-P LDs, in which the wavelength-locked F-P LD uses AWG each having a broader bandwidth than the bandwidth of BLS to be injected. It is also possible to embody a high density WDM-PON based on a wavelength-independent device above.

In addition, according to a WDM-PON of the present invention, it is possible to accomplish a high speed transmission of 1 Gb/s or more.

BEST MODE FOR CARRYING OUT THE INVENTION

Hereinafter, structures and functions of preferred embodiments in accordance with the present invention are described in more detail with reference to the appended drawings.

Figure 1:
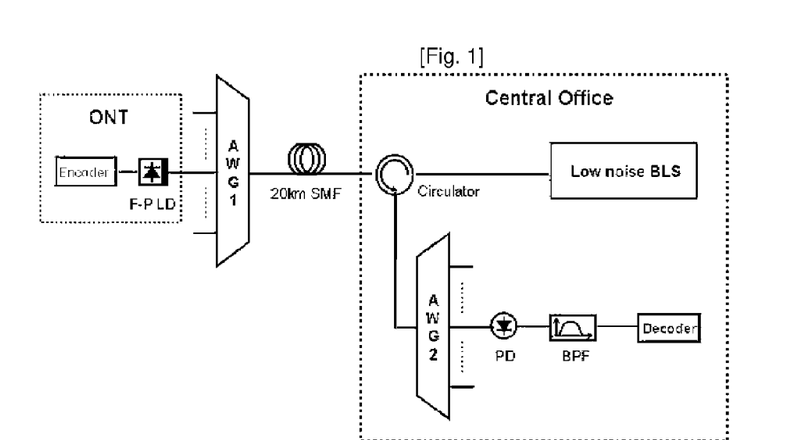
FIG. 1 illustrates a schematic diagram of WDM-PON comprising wavelength-locked F-P LD having wavelength-independence in accordance with an embodiment of the present invention.
Figure 2:
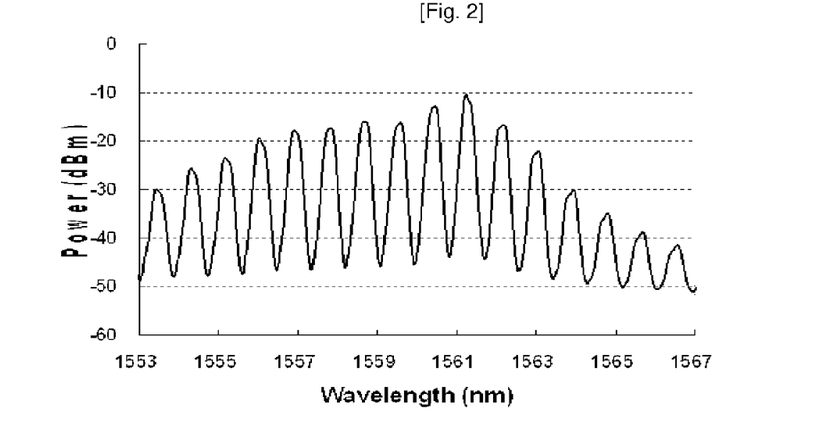
FIG. 2 illustrates an optical spectrum of BLS with a low noise characteristic in accordance with an embodiment of the present invention.

FIG. 1 illustrates a schematic diagram of WDM-PON comprising wavelength-locked F-P LD having wavelength-independence in accordance with an embodiment of the present invention. The BLS with a low noise characteristic used for an embodiment in FIG. 1 of the present invention is a multi-mode type light source embodied by using a mutual injection between two F-P LDs where a front-facet of each F-P LD is AR (Anti-Reflection) coated, and has an optical spectrum as shown in FIG. 2. A specific configuration of the BLS shown in FIG. 1 is described in more detail in an article by K. M. Choi, et al., entitled "Broadband Light Source Using Mutually Injected Fabry-Perot Laser Diode for WDM-PON" *IEEE Photon Technol. Lett.*, vol. 17, no. 12, pp. 2529-2531, December 2005. The content of article by K. M. Choi, et al. is incorporated by reference into the present invention herein.

Figure 3:
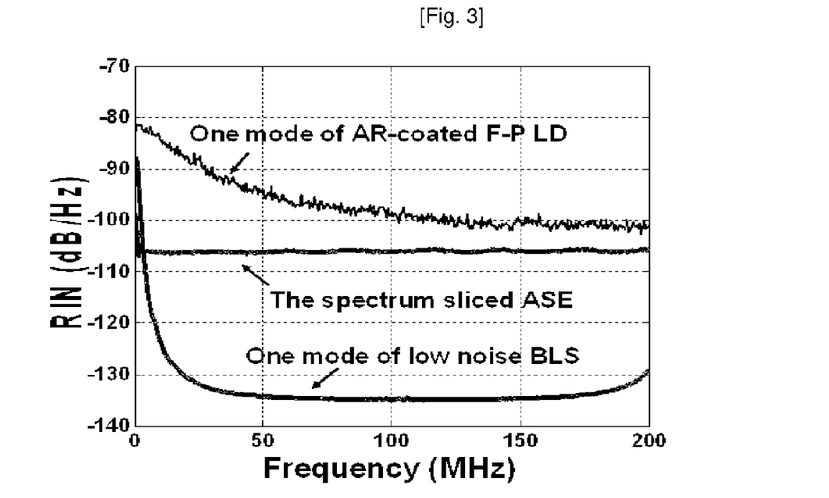
FIG. 3 illustrates the measured RIN from one mode of BLS with a low noise characteristic in accordance with an embodiment of the present invention, EDFA-based ASE, and AR-coated F-P LD, respectively.

As can be seen from an optical spectrum shown in FIG. 2 and RINs shown in FIG. 3, the bandwidth of each mode of BLS which is oscillated in a multi-mode is approximately 0.2 nm and RIN of each mode is significantly reduced compared with mode partition noise that one mode of AR coated solitary F-P LD has.

Figure 4:
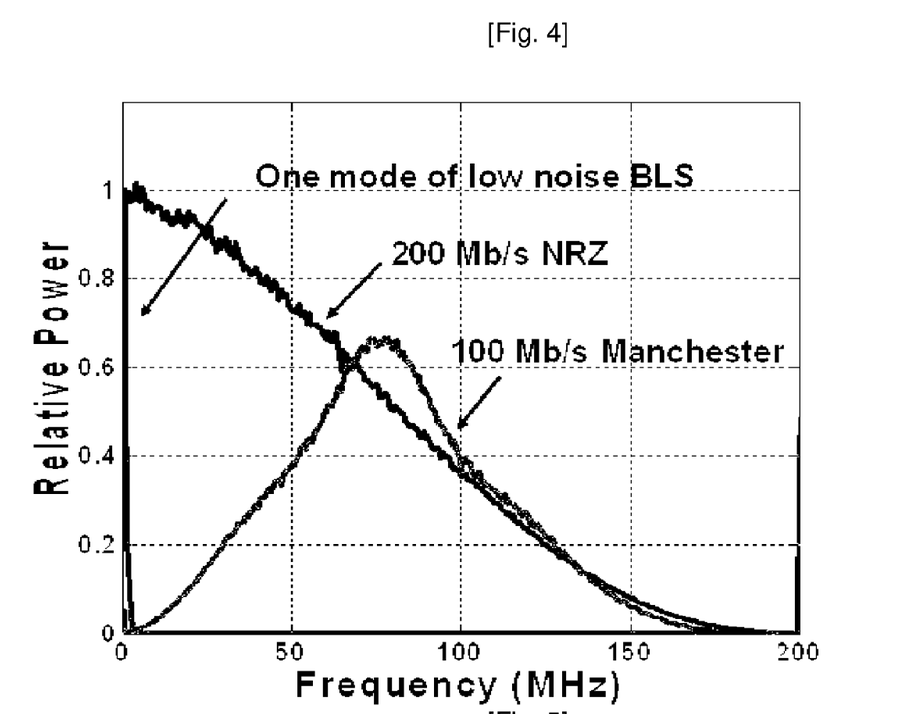
FIG. 4 illustrates electrical spectra which compare one mode of BLS with a low noise characteristic in accordance with an embodiment of the present invention with a modulation signal thereof.

Referring back to FIG. 1, output light of BLS having low noise at central office is transmitted through a circulator and a single mode fiber (SMF) and is filtered by AWG1. Then, filtered BLS is injected into F-P LD at optical network termination (ONT). Then, the F-P LD oscillates in a single mode and the wavelength thereof is locked to the injection wavelength. In this case, wavelength-locked F-P LD is modulated with a data format which is encoded from a non return to zero (NRZ) data to a Manchester code by an encoder. Modulated data signal is transmitted to AWG2 through AWG1, SMF and the circulator. As shown in FIG. 4, if the wavelength-locked light signal is modulated into a data format which does not have an electrical spectrum component at a low frequency region, like a Manchester code, a low frequency noise component (i.e., 1/f noise component) of injected BLS affects no influence on a data which is being transmitted. In addition, as shown in FIG. 1, a modulated data signal with a low frequency noise component arrives at a photo diode (PD), which is a receiving end of a central office, after passing through AWG2. The low frequency noise component is filtered by a band pass filter (BPF). Then, the modulated data signal is decoded into its original NRZ data from a data signal modulated in a Manchester code format by a decoder. AWG1 and AWG2 shown in a schematic diagram of FIG. 1 have a broader bandwidth than the bandwidth that one mode of BLS has as shown in FIG. 4. That is, when comparing 3 dB bandwidths at a wavelength region shown in FIG. 5, it is understood that AWG of 100 GHz has the broadest bandwidth, AWG of 50 GHz has the intermediate bandwidth, and BLS has the narrowest bandwidth.

Figure 5:
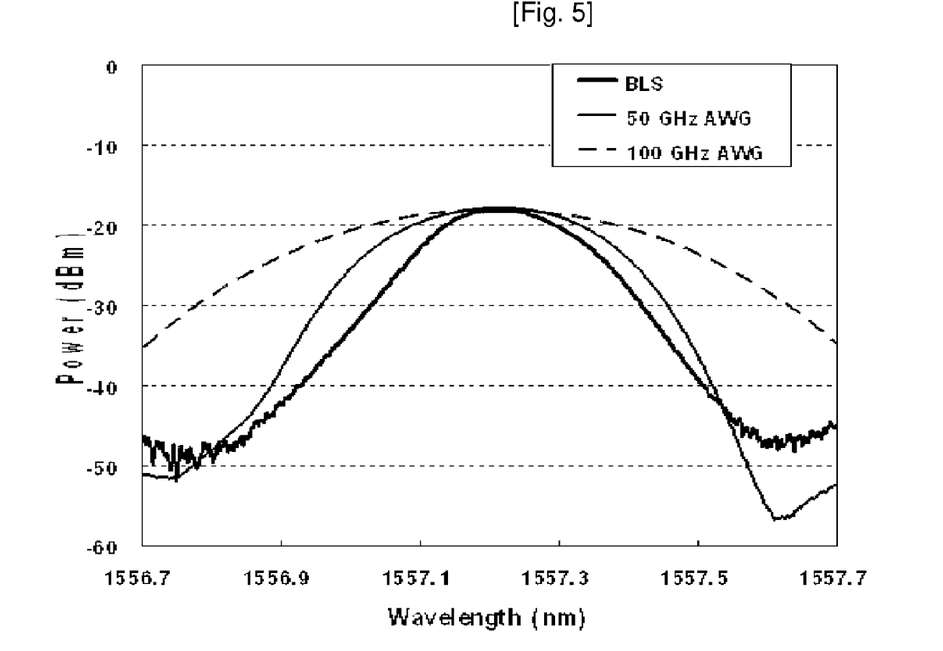
FIG. 5 illustrates optical spectra comparison of one mode of BLS with a low noise characteristic in accordance with an embodiment of the present invention and a bandwidth of AWG.

As described above, an oscillation wavelength of wavelength-locked F-P LD may vary when ambient temperature is changed so that a noise characteristic of wavelength-locked F-P LD is dependent on temperature. Accordingly, in order to embody a wavelength independent light source which is one of the important factors to be used for WDM light source in the present invention, it is a feature of the present invention to construct wavelength-locked F-P LD by injecting BLS with a low noise characteristic and to use AWG having a broader bandwidth than the bandwidth of BLS to be injected. It is possible to reduce noise which occurs due to a filtering of wavelength-locked F-P LD output, by using AWG having a broader bandwidth than the bandwidth of one of optical modes of BLS with a low noise characteristic in a multi-mode type as shown in FIG. 5 and having a channel spacing of 50 GHz or 100 GHz.

Figure 6:
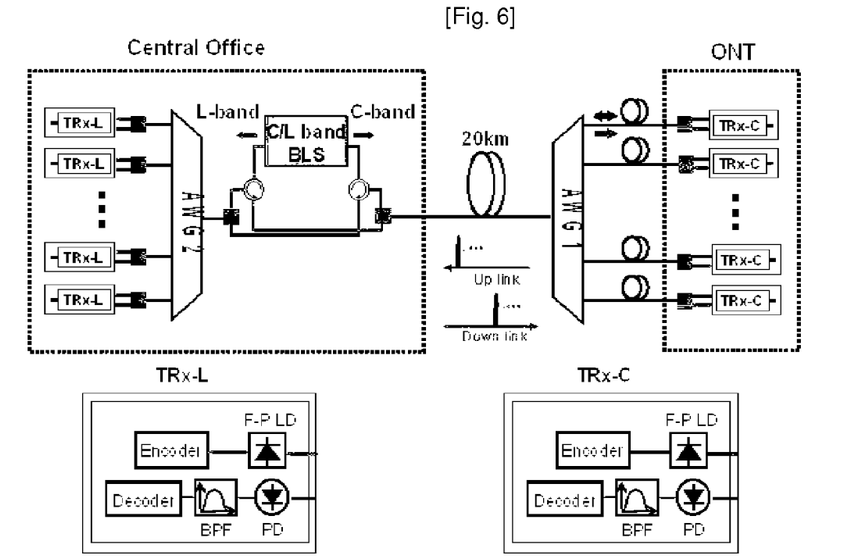
FIG. 6 illustrates a schematic diagram of WDM-PON which embodies wavelength independence of wavelength-locked F-P LD in accordance with an embodiment of the present invention.

FIG. 6 illustrates a view of WDM-PON which embodies wavelength independence of wavelength-locked F-P LD in accordance with an embodiment of the present invention. Referring to FIG. 6, C/L band BLS with a low noise characteristic using a mutual injection between F-P LDs at the central office passes SMF (20 Km) for transmission and is separated by AWG1 which filters multiple oscillation modes of BLS into a group of number n (n is an output port number of AWG1 or a channel number of WDM signals). Then, filtered n signals are respectively injected into n-numbered F-P LDs at ONT which output respective wavelength-locked light signals. Although it is described that F-P LD is used, as a device at ONT, for outputting wavelength-locked light signals in a preferred embodiment of the present invention, it is obviously understood by any skilled person in the art that RSOA may be used instead of F-P LD for the same purpose. In the above embodiment, the bandwidth of AWG1 must be broader than the bandwidth of one mode of BLS to be injected. Wavelength-locked n-numbered F-P LDs at ONT are modulated with a Manchester code. The modulated data signals are multiplexed after passing through AWG1 and are transmitted to the central office. The transmitted WDM data signals pass SMF (20 Km) and further pass the circulator which bypasses and outputs the WDM data signals and AWG2 which de-multiplexes the WDM data signals into a group of n numbers. The n-numbered de-multiplexed WDM data signals are transmitted to receiving end (TRx-L) at the central office. The bandwidth of AWG2 must also be broader than the bandwidth of one mode of BLS to be injected. Each data signal which is photoelectrically conversed by respective PD at the receiving end is transmitted to BPF. Noise of the data signal existing in a low frequency region is filtered by BPF and noise-filtered data signal is decoded from a Manchester-coded data signal into its original NRZ signal by a decoder.

Figure 7:
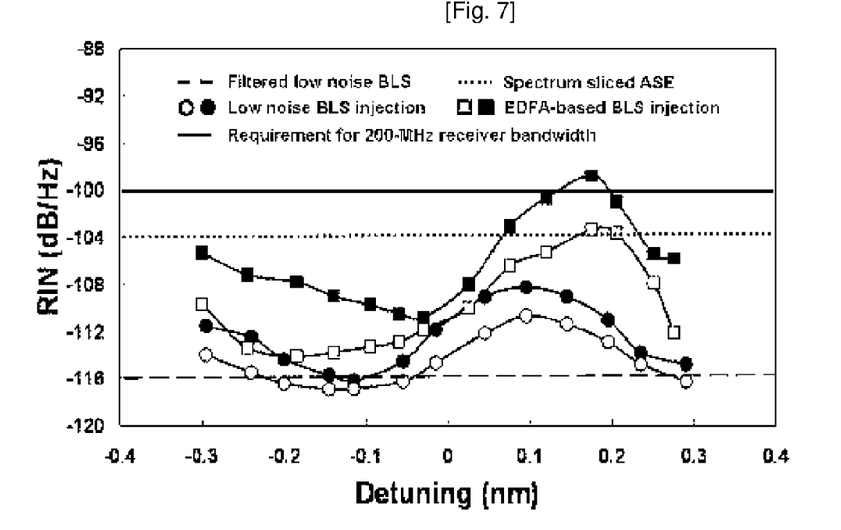
FIG. 7 illustrates noise characteristic of wavelength-locked F-P LD measured before and after being filtered by AWG in accordance with an embodiment of the present invention.

In one embodiment of the present invention, AWG1 and AWG2 have a bandwidth of 33.75 GHz (0.27 nm), respectively, which is broader than the bandwidth 0.2 nm of BLS to be injected and FIG. 7 illustrates a view of noise characteristic of wavelength-locked F-P LD measured before and after being filtered by AWG in accordance with this embodiment of the present invention. Referring to FIG. 7, RIN of BLS with a low noise characteristic which is filtered after passing through AWG1 shows a 12 dB lower noise compared with RIN of ASE filtered with the same bandwidth as that of one mode of the low noise BLS, as can be seen from FIG. 7. In this embodiment, the measured RIN of BLS with a low noise characteristic is measured within a range from 0.8 MHz to 200 MHz for filtering 1/f noise. In case of transmitting a data signal of 100 Mb/s which is modulated into a Manchester code, RIN requirement for satisfying the BER of $10^{-2}$ (Q=7) is −100 dB/Hz (corresponding to 200 MHz line).

More specifically, in FIG. 7, RIN of total modes (white circle) of F-P LD which is wavelength-locked after BLS with a low noise characteristic which is filtered by AWG1 is injected into F-P LD at ONT side and RIN of data signal (black circle) which arrives at receiving end (TRx-L) of the central office after passing through AWG1 and AWG2 are measured to confirm the possibility of wavelength-independence, and noise degradation characteristics occurred due to both AWG1 and AWG2 are compared. Measured RIN can be indicated as a detuning value defined by a difference between a center wavelength of BLS to be injected for wavelength-locking and an oscillation wavelength of wavelength-locked F-P LD. RIN of data signal (black circle) which arrives at receiving end (TRx-L) of the central office exists below −100 dB/Hz in a whole detuning region. It is sufficiently understandable that RIN of data signal (black circle) satisfies the requirement for wavelength-independence. Further, the degradation of RIN occurred when filtering is performed by both AWG1 and AWG2 is approximately 1~3 dB (a difference value between a maximum value and a minimum value in the whole detuning region of black circle and white circle).

In the meantime, in case of transmitting NRZ data of 200 Mb/s by using the same receiver (having 200 MHz bandwidth) while using ASE as BLS to be injected, the intensity noise required for wavelength-independence is −100 dB/Hz. The measured RIN (black rectangle) after passing both AWG1 and AWG2, by using same method as the embodiment of the present invention in FIG. 7, does not meet the requirement for wavelength-independence in a specific detuning region. FIG. 7 clearly shows that maximum noise degradation occurred due to AWG1 and AWG2 is up to 7 dB (corresponding to a maximum difference value in the whole detuning region between black rectangle and white rectangle).

Figure 8:
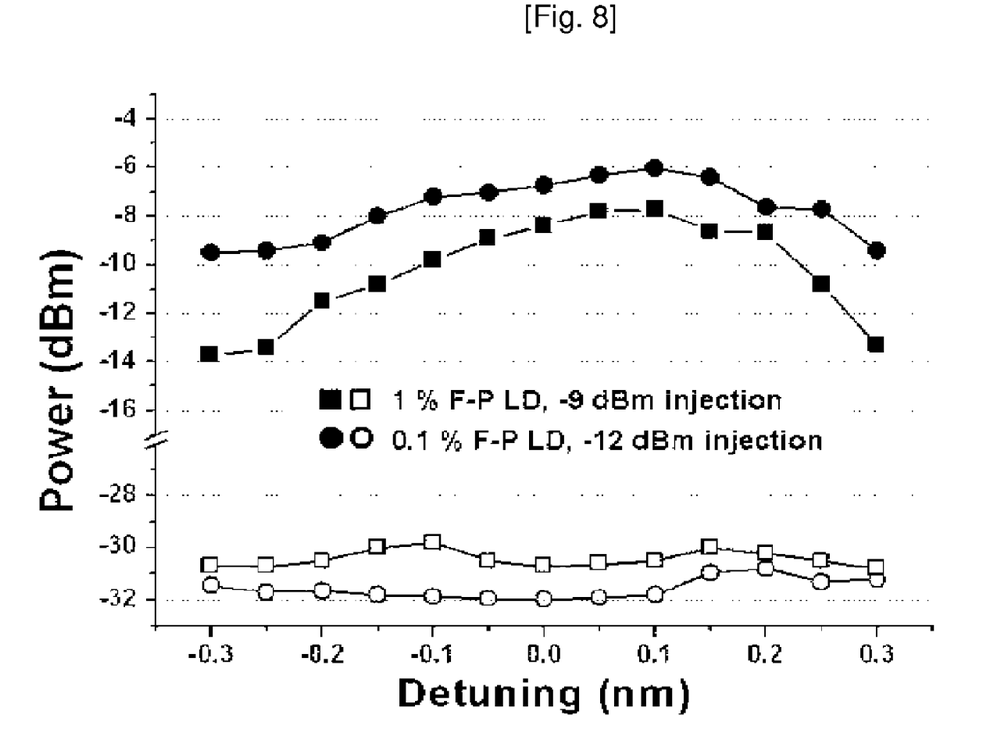
FIG. 8 illustrates signal power and receiver sensitivity of wavelength-locked F-P LD in accordance with an embodiment of the present invention.

FIG. 8 illustrates a view of signal power (black) and receiver sensitivity (white) of wavelength-locked F-P LD in accordance with an embodiment of the present invention. More specifically, FIG. 8 shows receiver sensitivity at BER of $10^{-10}$ to confirm wavelength-independence of F-P LD which is wavelength-locked by injection of BLS with a low noise characteristic, and signal power measured along the detuning. The maximum difference of receiver sensitivity which satisfies BER of $10^{-10}$ obtained from the whole detuning range of 0.6 nm which corresponds to a mode spacing of F-P LDs to be used is approximately 1.5 dB (corresponding to a difference value between a maximum value and a minimum value in white circle or white rectangle). Further, it is understandable from FIG. 8 that wavelength-locked F-P LD according to the present invention meets the requirement for embodying wavelength-independence even when injecting BLS with 3 dB reduced injection power, in case that the front-facet reflectivity of F-P LD to be used is reduced from 1% to 0.1%. Referring to FIGS. 7 and 8, it is possible to embody wavelength-locked F-P LD with a low noise characteristic by injecting BLS having low noise characteristic, and also to embody WDM-PON for subscribers independent of a temperature change by minimizing noise due to being filtered by AWG having a broader bandwidth than the bandwidth of BLS to be injected.

All the embodiments of the present invention described above illustrate an upstream case of transmitting a data signal from ONT side to the central office side. However, it is easily understood by any skilled person in the art that the embodiments of the present invention may be applied to a downstream case that a data signal is transmitted from the central office side to ONT side. That is, WDM-PON having wavelength-independence in accordance with the present invention can be used as an optical transmission apparatus for bidirectional communication. Further, a transmitter and a receiver of the present invention shown in FIG. 6 can be structured as a transceiver which is a combination of a transmitter and a receiver. In such a case, the transceiver has a structure where an input signal to the transceiver and an output signal from the transceiver are transmitted after separation by WDM filter (e.g., AWG).

INDUSTRIAL APPLICABILITY

According to a WDM-PON of the present invention, it is possible to embody a device for subscribers having wavelength-independence by minimizing noise of wavelength-locked F-P LD through injecting a low noise BLS employing a mutual injection principle of F-P LDs, in which the wavelength-locked F-P LD uses AWG each having a broader bandwidth than the bandwidth of BLS to be injected. It is also possible to embody a high density WDM-PON based on a wavelength-independent device above.

In addition, according to a WDM-PON of the present invention, it is possible to accomplish a high speed transmission of 1 Gb/s or more.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An apparatus, comprising:
a broadband light source to output light having a plurality of modes;
a first multiplexer/demultiplexer having a plurality of channels, wherein a first channel of the plurality of channels has a first bandwidth to select a mode of the plurality of modes to provide an injection wavelength associated with the selected mode, wherein the selected mode has a second bandwidth;
one or more light sources capable of lasing to output a first wavelength locked to the injection wavelength associated with the selected mode, wherein the first bandwidth of the first channel is greater than the second bandwidth of the selected mode of the light injected through the first channel.

2. The apparatus of claim 1, wherein the broadband light source has a noise lower than 100 dB/Hz.

3. The apparatus of claim 1, wherein the one or more light sources capable of lasing comprises a Fabry-Perot Laser Diode, a reflective semiconductor optical amplifier, or any combination thereof.

4. The apparatus of claim 1, wherein the first multiplexer/demultiplexer includes arrayed waveguide gratings.

5. The apparatus of claim 1, further comprising:
a second multiplexer/demultiplexer having a third bandwidth coupled to the first multiplexer/demultiplexer, wherein the third bandwidth is greater than the second bandwidth of the light; and
one or more receivers coupled to the second multiplexer/demultiplexer.

6. The apparatus of claim 5, further comprising:
a band pass filter coupled to the one or more receivers.

7. The apparatus of claim 1, further comprising:
an encoder coupled to the one or more light sources capable of lasing.

8. The apparatus of claim 1, further comprising:
a circulator coupled to the broadband light source.

9. A system comprising:
a broadband light source to output light having a plurality of modes;
a first multiplexer/demultiplexer having a plurality of channels, wherein a first channel of the plurality of channels has a first bandwidth to select a first mode of the plurality of modes to provide a first injection wavelength associated with the first mode, the first mode having a second bandwidth, wherein the first bandwidth of the first channel is greater than the second bandwidth of the first mode injected through the first channel;
one or more first transmitters to provide a first output wavelength locked to the first injection wavelength;
a second optical multiplexer/demultiplexer having a third bandwidth to select a second mode of the plurality of modes to provide a second injection wavelength associated with the second mode having a fourth bandwidth, wherein the third bandwidth is greater than the fourth bandwidth.

10. The system of claim 9, further comprising:
one or more second transmitters to provide a second output wavelength locked to the second injection wavelength.

11. The system of claim 9, further comprising:
a circulator coupled to the broadband light source.

12. The system of claim 9, further comprising:
an encoder coupled to the one or more transmitters.

13. The system of claim 9, wherein the one or more transmitters includes a Fabry-Perot Laser Diode, a reflective semiconductor optical amplifier, or any combination thereof.

14. The system of claim 9, wherein the first multiplexer/demultiplexer includes arrayed waveguide gratings.

15. The system of claim 9, wherein the broadband light source has a noise lower than 100 dB/Hz.

16. A method comprising:
supplying a broadband light having a plurality of modes;
selecting a mode of the plurality of modes of the light by a first channel of a plurality of channels of a multiplexer/demultiplexer, wherein the first channel has a first bandwidth to provide a first injection wavelength associated with the selected mode having a second bandwidth, wherein the first bandwidth of the first channel is greater than the second bandwidth of the selected mode injected through the first channel;
generating a first output wavelength locked to the first injection wavelength.

17. The method of claim 16, further comprising:
multiplexing the first wavelength at a first location;
demultiplexing the first wavelength at a second location at a third bandwidth, wherein the third bandwidth is greater than the second bandwidth.

18. The method of claim 16, further comprising:
encoding an optical signal having the first wavelength.

19. The method of claim 16, further comprising:
selecting a mode of the plurality of modes of the light at a third bandwidth to provide a second injection wavelength associated with the selected mode having a fourth bandwidth, wherein the third bandwidth is greater than the fourth bandwidth; and
generating a second output wavelength locked to the second injection wavelength.

20. A system comprising:
means for supplying a broadband light having a plurality of modes;
means for selecting a mode of the plurality of modes of the light by a first channel of a plurality of channels of a multiplexer/demultiplexer, wherein the first channel has a first bandwidth to provide a first injection wavelength associated with the selected mode having a second bandwidth, wherein the first bandwidth of the first channel is greater than the second bandwidth of the selected mode injected through the first channel;
means for generating a first output wavelength locked to the first injection wavelength.

21. The system of claim 20, further comprising:
means for multiplexing the first wavelength at a first location;

means for demultiplexing the first wavelength at a second location at a third bandwidth, wherein the third bandwidth is greater than the second bandwidth.

22. The system of claim 20, further comprising:
means for selecting a mode of the plurality of modes of the light at a third bandwidth to provide a second injection wavelength associated with the selected mode having a fourth bandwidth, wherein the third bandwidth is greater than the fourth bandwidth; and
means for generating a second output wavelength locked to the second injection wavelength.

\* \* \* \* \*